Oct. 3, 1944.　　　　E. MARGULIES　　　　2,359,659
FILM FRAME
Filed March 22, 1943
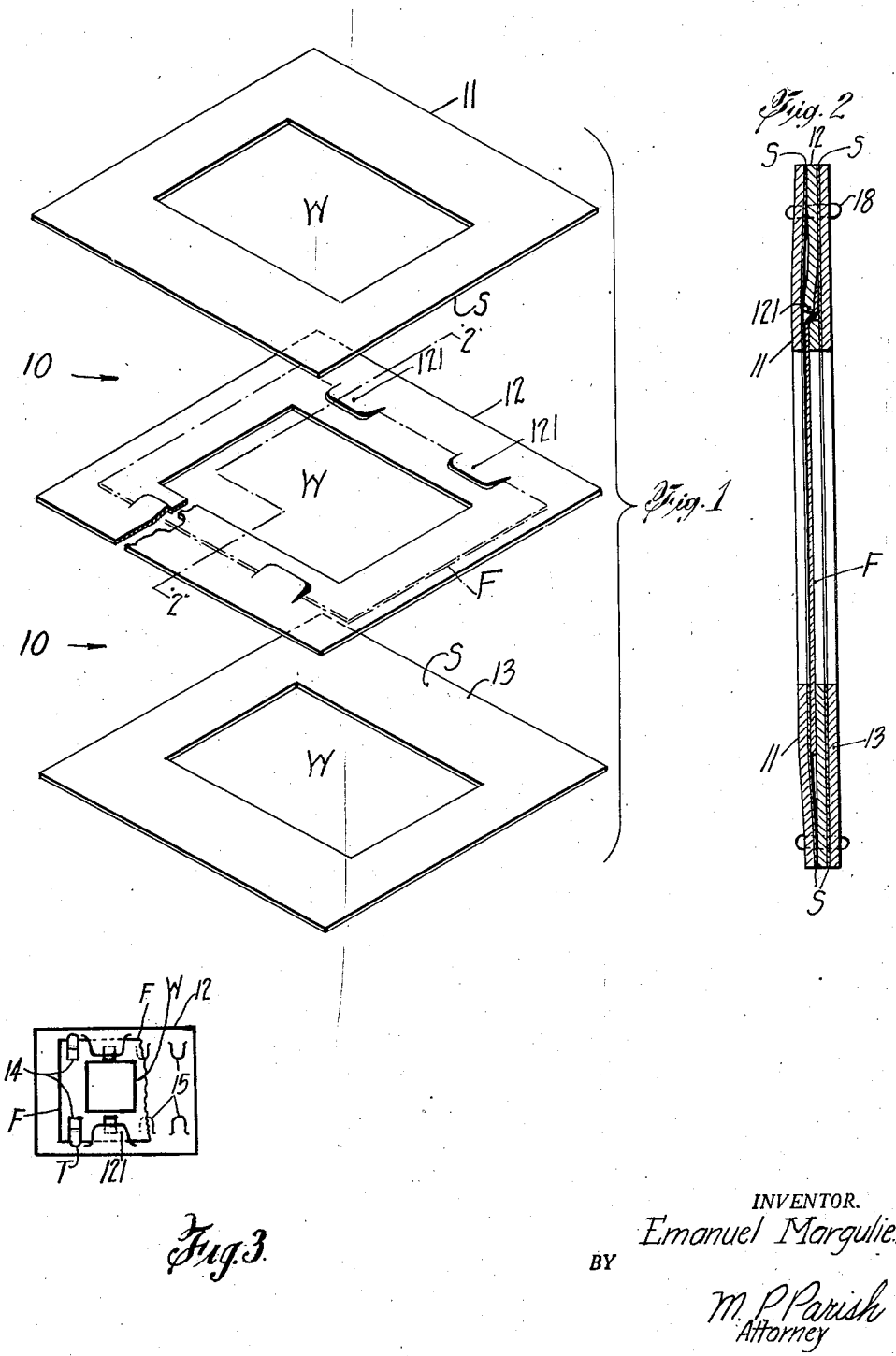
INVENTOR.
Emanuel Margulies
BY
M. P. Parish
Attorney Patented Oct. 3, 1944

2,359,659

UNITED STATES PATENT OFFICE 2,359,659

FILM FRAME

Emanuel Margulies, Linden, N. J.

Application March 22, 1943, Serial No. 479,977

2 Claims. (Cl. 88—26)

This invention relates to film frames preferably of fibre, for housing and preserving film. Such framed film is usually thereafter projected for enlarged showing thereof.

An object is the provision of means for economic manufacture and use of such frames.

Another object is the provision of means for slidable adjustment of the film in the frame to center the film therein.

Still another object is the provision of means for manufacture of such a frame of three joinable parts each made of simple stampings two of which may be similar in shape and size.

Another object is the provision of integral means in the central frame piece to removably engage certain type film therewith.

These and other objects will be readily understood from the following description and accompanying drawing forming part thereof.

In the drawing,

Fig. 1 is a perspective view of the three parts of my frame (shown bracketted) and showing a film (dot-dash) in place on the central member.

Fig. 2 is a cross section of the assembled frame taken on line 2—2 of Fig. 1.

Fig. 3 is a fragmentary detail plan view of the central element 12 of Fig. 1 showing on reduced scale a method of engaging the teeth holes of 35 mm. film with corresponding stamped out teeth in the central element after the film has been centered in the window W.

It has been found desirable by many to project small sized film for enlarged showing thereof. Film carriers or frames for such small film have been found advantageous to provide for better film handling and to assure preservation of the film.

My film frame 10 (Fig. 1), comprises three main pieces of preferably suitable paper having a top 11, center 12, and bottom 13. Each said member has a central window W of similar size and shape although in one embodiment the window W of central member 12 may be larger than the juxtaposed windows of members 11 and 13, for reasons to be explained. All or part of the surfaces of top and bottom members which contact center member 12 are preferably glue coated so that the three juxtaposed members may be fastened together. Other fastening means may be used such as stapling means 18 etc., the latter being preferred when reuse of the frame is desired. For example a housed film may be removed from the frame by removing one or more said staples 18 and a new film may then be inserted and held in the frame when the members are again joined together by other staples.

The center 12 may have a number of integral pressed out tongues 121 as shown on Fig. 1, between which and member 12 a film F may be slidably housed. Such structure provides track means for sliding movement of film F to center the film in the frame window W. At times the film contacting surface of tongue 121 or the film contacting surface of member 12 may be glue coated to provide fastening of the film to member 12 after the film is centered in the window. It is seen that the three pieces are engageable to comprise an economical film carrier.

At times other means to fasten certain film in the central member may be used, thus when motion picture type film such as the 35 mm. film F having sprocket-wheel-teeth-engaging ports 14 is housed in member 12 the evenly spaced apart ports inherent in such film may be utilized. For port engaging means I provide a series of tongues 15 selectively depressable out of member 12. The tongue 15 registering with the juxtaposed port 14 is pushed thru the port and bent back as at T in Fig. 3, to fasten the already centered film. Said tongues 15 are formed by lines of weakness formed in the paper preferably when the blank 12 is formed. The tongues 15 are spaced in the paper so that one of them will register with a port in the film wherever the film may be finally centered on member 12. This is accomplished by irregular spacing of the tongues in the paper as compared with the regular spacing of said film ports in the film.

I claim:

1. In a device of the character described having separate fibre top, bottom and middle elements uniform in shape and size and each having a relatively uniform central window portion therein, said middle element having integral tongues depressable therefrom forming track-means for movably housing a strip of film thereon and for holding the film centered relative to said windows, means fastening the top, bottom and middle elements together in registration whereby the margins of the film are masked and the peripheral edges of the fastened registered top, bottom and middle elements remain bare, said means penetrating the top, middle and bottom elements, ports in said film, a number of additional tongues on the middle element, at least two of said tongues engageable with said film ports when the film is centered in the window removably engaging the film with the middle element.

2. In a device of the character described having separate fibre top, bottom and middle elements uniform in shape and size and each having a relatitvely uniform central window portion therein, said middle element having integral tongues depressable therefrom forming track means for movably housing a strip of film thereon and for holding the film centered relative to said windows, means fastening the top, bottom and middle elements together in registration whereby the margins of the film are masked and the peripheral edges of the fastened registered top, bottom and middle elements remain bare, said means perforating the top, middle and bottom elements, ports in said film, a number of additional tongues on the middle element, at least two of said tongues engageable with said film ports when the film is centered in the window removably engaging the film with the middle element.

EMANUEL MARGULIES.